United States Patent [19]

Phillips

[11] 4,127,993

[45] Dec. 5, 1978

[54] METHOD AND GENERATOR UNIT OF AN ABSORPTION HEAT PUMP SYSTEM FOR SEPARATING A RICH LIQUOR INTO A REFRIGERANT AND A SOLUTION LOW IN REFRIGERANT CONTENT

[75] Inventor: Benjamin A. Phillips, Benton Harbor, Mich.

[73] Assignee: Allied Chemical Corporation, Morris Township, Morris County, N.J.

[21] Appl. No.: 796,493

[22] Filed: May 12, 1977

[51] Int. Cl.² .................... F25B 15/00; F25B 33/00
[52] U.S. Cl. ........................... 62/101; 62/476; 62/487; 62/497
[58] Field of Search .............. 62/476, 487, 497, 101; 122/348

[56] References Cited

U.S. PATENT DOCUMENTS

| 1,791,441 | 2/1931 | Bertsch | 62/101 |
|---|---|---|---|
| 2,623,366 | 12/1952 | Edel | 62/487 |
| 2,729,952 | 1/1956 | Whitlow | 62/487 |
| 2,999,373 | 9/1961 | Stierlin | 62/497 |
| 3,254,507 | 6/1966 | Whitlow | 62/476 |
| 3,323,323 | 6/1967 | Phillips | 62/497 |
| 3,367,137 | 2/1968 | Whitlow | 62/497 |
| 3,407,625 | 10/1968 | McDonald | 62/476 |
| 3,509,732 | 5/1970 | Roeder, Jr. | 62/494 |
| 3,693,373 | 9/1972 | Gable | 62/497 |
| 3,828,575 | 8/1974 | Malcosky et al. | 62/497 |

*Primary Examiner*—Lloyd L. King
*Attorney, Agent, or Firm*—Alan M. Doernberg; Jay P. Friedenson

[57] ABSTRACT

A generator unit of an absorption heat pump system having a plurality of vertical tubular conduits around the reservoir zone in the lower portion of the generator unit, each conduit having a lower opening for drawing rich liquor from the reservoir portion. Heat is transferred from an external source into the vertical conduits. A method of separating rich liquor into refrigerant vapor and weak liquor including drawing rich liquor into vertical tubular conduits at a temperature at which bubbles of refrigerant vapor are forming in the rich liquor, heating the rich liquor in the vertical conduits thereby increasing the formation of refrigerant bubbles, driving the rich liquor upward in the vertical conduits with increasing speed by the vapor lift action of refrigerant bubbles and separating the fluid coming out of the vertical conduits into the refrigerant vapor and weak liquor.

36 Claims, 9 Drawing Figures

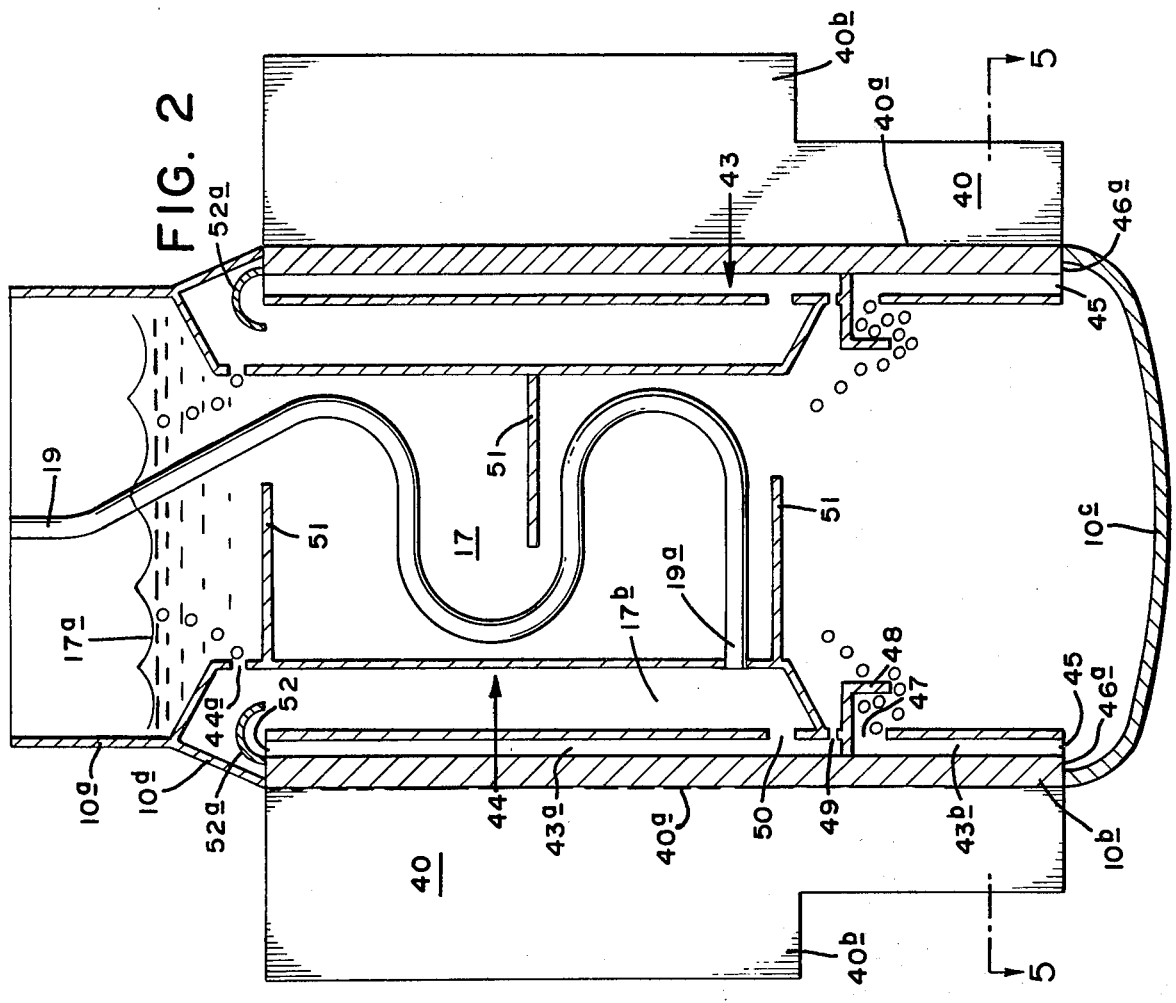
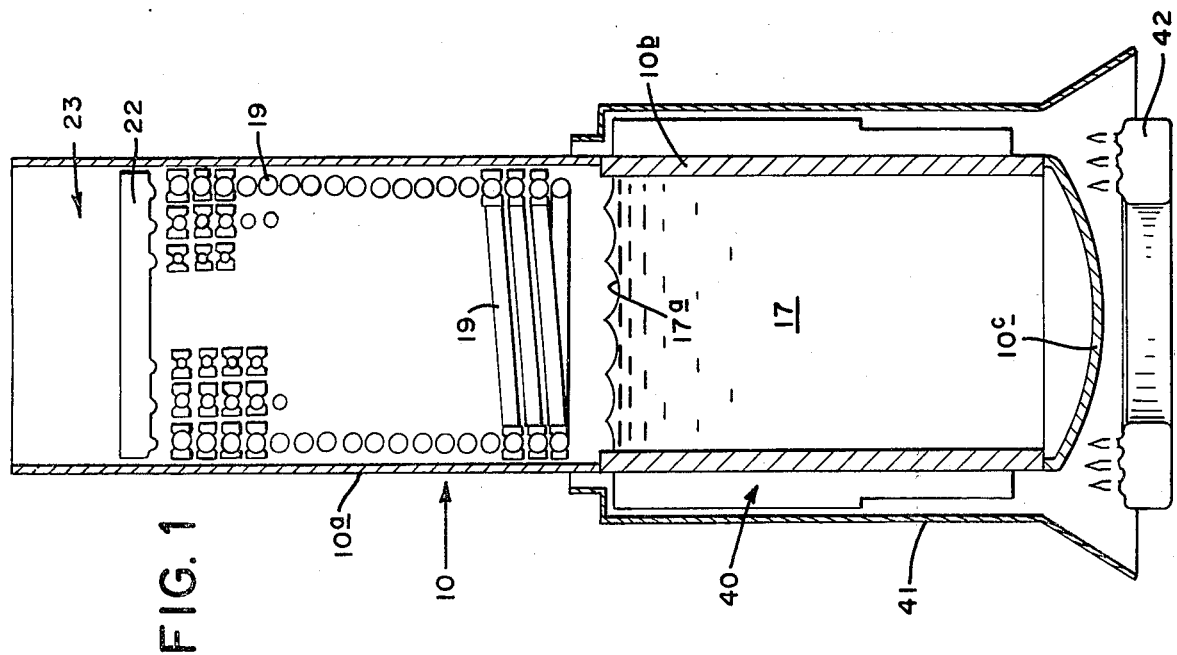

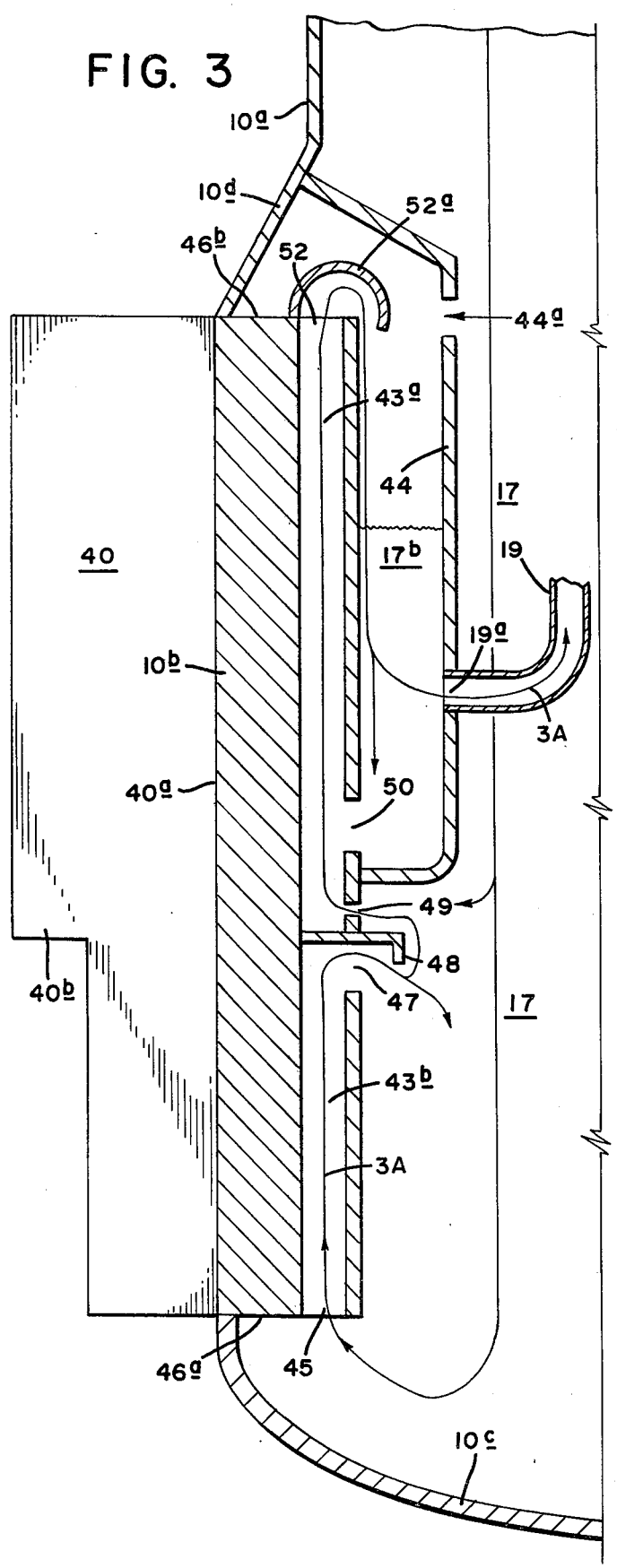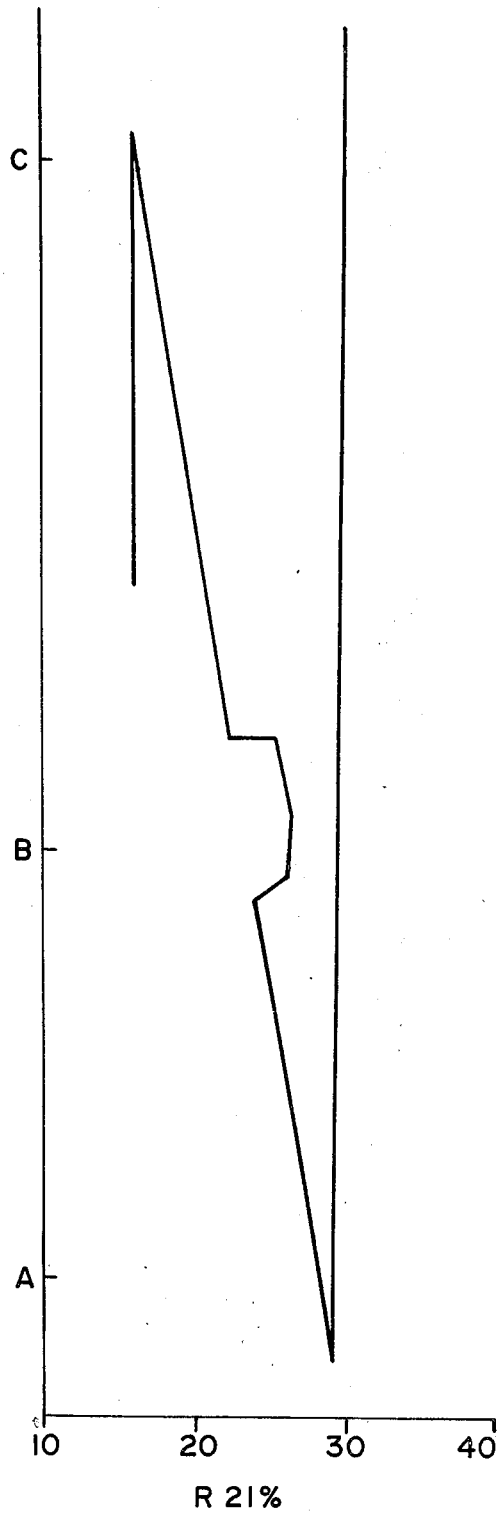

METHOD AND GENERATOR UNIT OF AN ABSORPTION HEAT PUMP SYSTEM FOR SEPARATING A RICH LIQUOR INTO A REFRIGERANT AND A SOLUTION LOW IN REFRIGERANT CONTENT

BACKGROUND OF THE INVENTION

Absorption refrigeration and heat pump systems include a "generator" unit where refrigerant vapor is generated from a solution of refrigerant in absorbent. Absorption refrigeration and heat pump systems have generally heretofore employed pool boiling techniques for generating refrigerant vapor from the rich liquor (also called weak absorbent solution). Thus, in U.S. Pat. No. 3,270,523, a system is disclosed including a generator having a generator reservoir and a coil drawing rich liquor downward from a first position of the generator reservoir and helically upward around a burner and back to a second portion of the generator reservoir. The second portion of the generator reservoir is beside the first portion and separated from the first portion by a baffle. Refrigerant, which is present in a relatively high concentration in the rich liquor (weak absorbent solution), passes from the surface of the second portion of the generator reservoir into the analyzer portion of the generator and eventually to the condenser unit of the system. The solution which remains in the second portion of the generator reservoir, called weak liquor (or strong absorbent solution), is depleted in refrigerant. It should be noted that the weak liquor may theoretically be so depleted of refrigerant so as to be essentially pure absorbent, but the term "solution" is still used although not technically correct. The weak liquor passes from the second portion of the generator reservoir into an analyzer coil which passes in heat exchange relation with the first portion of the genrator reservoir and (in the analyzer section) with incoming rich liquor.

Such a pool boiling technique suffers several drawbacks. In absorption systems it is generally advantageous to boil the absorbent-refrigerant solution to the highest practical temperature in order to reduce the concentration of refrigerant in the absorbent solution as much as possible. The peak boiling point is often limited by the temperature of the boiler wall, however, because corrosion or decomposition reactions at the boiler wall may be the factor limiting the peak-operating temperature, or may require the use of unacceptably expensive materials of construction to prevent such reactions.

To produce boiling, a significant minimum temperature differential ($\Delta t$) is required between the heat transfer surface and the body of the liquid. Known properties of boiling liquids, illustrated for example on page 13-2 of *Handbook of Heat Transfer* by W. M. Rohsenow and J. P. Hartnett (New York 1973), indicate that for pool boiling a minimum boiling $\Delta t$ is required even at low heat transfer rates. The minimum $\Delta t$ is a function of the fluids being boiled. If boiling occurs at a normal smooth surface, the $\Delta t$'s may vary from 10° to over 100° F. depending on the fluid. When the wall temperature determines the potential for corrosion or decomposition, as is the case for many absorption pairs (refrigerant and absorbent), the maximum usable liquid temperature may therefore have to be much lower than the limiting wall temperature. In experiments conducted with dichloromonofluoromethane as refrigerant and ethyl tetrahydrofurfuryl ether as absorbent, $\Delta t$'s of 70°-90° F. were found to be necessary at the desired heat fluxes in a normal smooth vertical tube of 6 inch diameter.

One method of reducing the boiling temperature differential is to use the "boiling chips" common in organic laboratory and distillation processes. The Linde HYFLUX® boiling surface is a variation on the boiling chip process. It utilizes a porous metal film sintered on the boiler surface. The HYFLUX surface is highly effective in reducing the boiling $\Delta t$ when boiling pure liquids. However, when a solution is being boiled, as in an absorption system, the reduction of $\Delta t$ is much less. The reduced effectiveness in boiling solutions is presumed to be due, at least in part, to the high boiling liquid remaining in the pores as the low boiling component is evaporated off.

Another means of producing high boiling heat transfer rates at low t is to utilize forced convection of the boiling liquid. The gains available by using forced convection are indicated qualitatively on the upper left of the chart on page 13-2 of the Rohsenow and Harnett book. It is indicated that higher transfer rates are possible at lower temperature differentials than occur with pool boiling at high $\Delta t$'s. Normally, if forced convection were used, it would require the application of some means of stirring the liquid, with mechanical stirring being undesired because of the power requirements and the need for means for transferring the power into the hermetical system without the use of seals which could leak. To eliminate the potential drawbacks of mechanical stirring, the present invention utilizes the high liquid velocities produced in vapor lift action within vapor lift or "percolator" tubes to produce forced convection boiling with no moving part.

Up to five advantages or objectives are achieved in the practice of the present invention, compared to pool boiling systems: (1) the boiling heat transfer rates are increased in all embodiments of the present invention thus reducing the temperature differential below that required for pool boiling; (2) the boiler wall temperature is decreased in many embodiments at locations where the method described in #1 is less effective; (3) the boiler is caused in most embodiments to have a fractionating effect within itself; (4) the residence time of the boiling liquid at its peak boiling temperature is minimized to a varying extent in the several embodiments; and (5) in some embodiments the fin surfaces are attached to the boiler in a manner producing a safeguard against overheating of the boiler.

Pump tubes have on occasion been suggested for use in the generator portion of an absorption system. For example in FIG. 9 of U.S. Pat. No. 3,516,264 (June 23, 1970 to Stierlin) a "pumping tube" is provided with heating means at its lower end only. Liquid is driven upward by refrigerant bubbles rising, but no further heat is applied to the fluid in the upwardly extending conduit. Pump tubes of sorts are disclosed in U.S. Pat. Nos. 1,729,355 (Sept. 24, 1929 to Munters) 1,791,441 (Feb. 3, 1931 to Bertsch), 1,886,243 (Nov. 1, 1932 to Gordon), 2,480,497 (Aug. 30, 1949 to Meyer), 2,557,573 (June 19, 1951 to Sherwood), 2,617,632 (Nov. 11, 1952 to Simpson), 2,625,801 (Jan. 20, 1953 to Whitlow) and 2,625,802 (Jan. 20, 1953 to Whitlow).

Finned generator devices are also known, as for example in U.S. Pat. Nos. 2,306,704 (Dec. 29, 1942 to Kogel), 3,254,507 (June 7, 1966 to Whitlow) 3,367,310 (Feb. 6, 1968 to Whitlow et al.), 3,407,625 (Oct. 29, 1968 to McDonald). A fire tube furnace with circumferentially spaced holes is disclosed in U.S. Pat. Nos.

3,895,607 (July 22, 1975 to Johnson) and 2,030,265 (Feb. 11, 1936 to Nygaard).

BRIEF DESCRIPTION OF THE INVENTION

The invention includes a generator unit of an absorption heat pump system for separating rich liquor into refrigerant vapor and weak liquor, and including a boiler portion at the lower portion thereof and comprising:

(a) an upstanding housing defining therewithin a central space with a reservoir zone in the lower portion thereof for storing the rich liquor solution and also defining a plurality of vertical tubular conduits around the reservoir zone, each tubular conduit having a lower opening communicating with the reservoir zone for drawing solution therefrom and an upper opening for releasing refrigerant vapor and weak liquor;

(b) heat transfer means for collecting heat from an external source and transferring the heat into said tubular conduits; and (c) separation means communicating with the upper openings of said tubular conduits for separating refrigerant vapor from weak liquor.

The invention also includes a method of separating a rich liquor comprising a refrigerant and a higher-boiling absorbent into refrigerant vapor and a solution low in refrigerant content comprising the steps:

(a) drawing the rich liquor into a lower inlet of a vertical conduit at a temperature at which bubbles of refrigerant vapor are forming in the rich liquor, (b) heating the rich liquor in the conduit thereby increasing the formation of bubbles of refrigerant vapor, (c) driving the rich liquor upward in the vertical conduit with increasing speed by the vapor lift action of refrigerant bubbles to an upper outlet of the vertical conduit, and (d) separating the fluid coming out of the upper outlet of the vertical conduits into refrigerant vapor and a solution low in refrigerant content.

The practice of the present invention overcomes the disadvantages of pool boiling, as discussed above, and provides or achieved one or more of the above-described advantages or objects.

This invention also includes a method and apparatus for distilling a lower boiling component from a solution of higher boiling component in a lower boiling component. It has special application whenever the maximum temperature desirable to achieve maximum separation approaches a reaction temperature of the solution (because of decomposition of one or both components, reaction between the components or with the walls of the containing vessel by one or both components, a corrosion process). The distilling method of the invention includes the above steps for a method of separating, and the distilling apparatus of the invention includes the above elements of a generator unit. In the distilling method "absorbent" should read "higher boiling component" and "refrigerant" should read "lower boiling component."

BRIEF DESCRIPTION OF THE DRAWING

FIG. 1 is a front elevational view of a generator unit according to a first embodiment of the present invention;

FIG. 2 is an enlarged front elevational view of the lower portion of the boiler of FIG. 1;

FIG. 3 is a further enlarged front elevational view of the boiler of FIG. 1;

FIG. 3A is a concentration graph of the liquid phase along line 3A in FIG. 3;

DETAILED DESCRIPTION OF THE INVENTION

Figure 6:
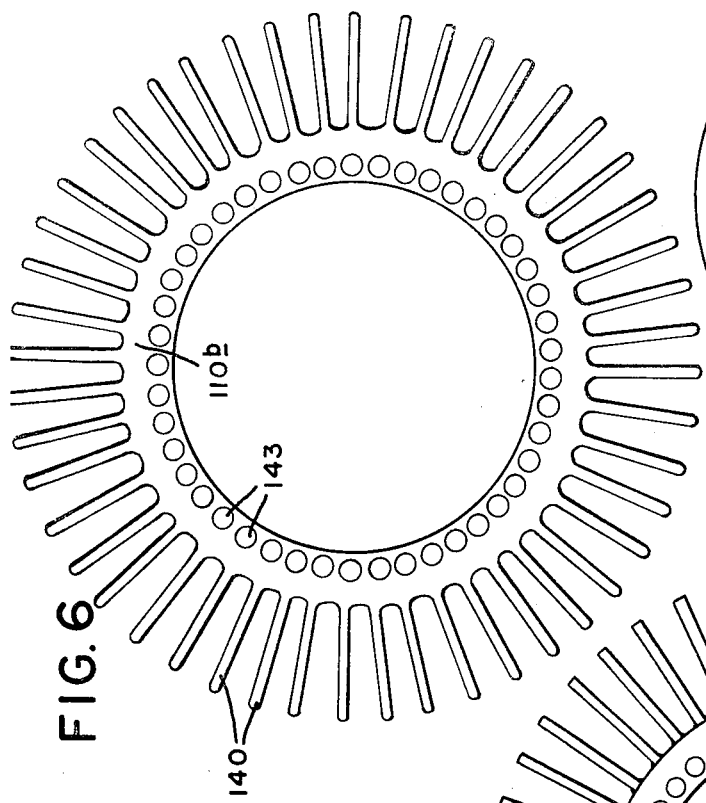
FIG. 6 is a view similar to FIG. 5 according to a second embodiment of the present invention.

In this disclosure the boiler is defined as that portion of the generator where the external heat input is applied. My copending, commonly assigned applications, Ser. No. 796,773, filed May 13, 1977 and Ser. No. 796,631, filed May 12, 1977, filed herewith, are incorporated by reference for, respectively, a description of a suitable overall heat pump system and a description of the entire generator unit having a boiler portion as described herein. For cost reasons the boiler of the absorption air conditioner has in recent years been normally built as a downward extension of the analyzer, or stripping section of the distillation column.

An exemplary boiler and analyzer unit suited to gas or oil heat is shown schematically in FIG. 1. Combustion products from the gas or oil flame flow vertically through the fins on the exterior of the boiler. The heat from the hot gases is transferred through the fins to the outer wall of the boiler and thence to the boiling liquid within. The boiler section will be considered to include not only the boiling heat transfer surfaces but also the internal components within the vertical space roughly defined by the fin height as shown in FIG. 1.

This invention includes a boiler wall incorporating a multiplicity of vertical tubular conduits which serve as vapor lift or "percolator" tubes. They will also be referred to as pump tubes. FIGS. 5 through 8 show horizontal cross-sections of several possible means of incorporating these vertical tubes in the boiler wall. By utilizing a boiler wall thus constructed the temperature difference in boiling R21-ETFE dropped from the 70°–90° F. at found in experiments involving pools boiling in a 6 inch diameter smooth vertical tube to 15°–20° F. t. The tubes may be fabricated within the wall by a variety of known processes. A preferred method is extrusion.

The effect of using a boiler of the present design is to create a concentration gradient of liquid solution with most of the liquid in the boiler at an intermediate temperature and only a small portion of the liquid at the peak temperature, and then only for a short residence time. It will be appreciated that the efficiency of an absorption system is improved by driving the maximum amount of refrigerant out of the rich liquor for use in the condensor. It will also be appreciated that, provided boiling occurs and provided vapor-liquid equilibrium is given sufficient time to be established, the higher the peak temperature is, then the more refrigerant will be boiled out of the rich liquor and thus the lower the weak liquor will be in refrigerant concentration. The present invention permits a particularly high peak temperature to be achieved without corrosion or decomposition and also provides for a maximum flow of heat from the heat source (such as a gas flame) into the solution.

Some preferred forms of the generator unit described in the Brief Description are those in which the lower portion of the generator housing (i.e. the boiler housing) is cylindrical and the tubular conduits are formed in the lower portion of the housing circumferentially spaced about the reservoir zone. Some more preferred forms of the generator unit are those wherein the boiler housing forms a lower ledge overlaying a lowest portion of the reservoir zone and the lower openings of the tubular conduits are formed in the lower ledge. Some more preferred forms are those wherein the boiler housing is of aluminum, or copper or their alloys and the tubular conduits are formed by extrusion. Suitable aluminum alloys are those which provide good heat conductivity and extrudability and which do not contribute appreciably to corrosion or decomposition of the absorption pair.

Some preferred forms of the generator unit are those wherein the heat transfer means include a plurality of fins projecting outwardly from the lower portion of the generator housing (i.e. the boiler housing) adjacent the tubular conduits. In some more preferred form, the fins are joined to the housing by joining means which permit the fins to detach from the housing upon exceeding a predetermined temperature (e.g. the solder or brazing alloy 40a in FIG. 5). In some more preferred forms the fins are integral with the lower portion of the housing (e.g. boiler housing 110b in FIG. 6). In such unitized housings and fins, the fins and lower portion of the housing (boiler housing) may be extruded as a unit with the tubular conduits formed in the lower portion by extrusion. In some more preferred forms, the fins extend vertically from a height adjacent the lower openings to a height adjacent the upper openings (e.g. fins 40 in FIG. 2).

In some preferred forms of the generator unit, the boiler housing also defines a plurality of lower apertures, each opening a vertical conduit to the reservoir zone at a height above the lower openings. In some more preferred forms, the separation means separates the reservoir zone into a major portion which communicates with the lower openings and a minor portion adjacent the upper portion of the tubular openings, the lower apertures connecting the major portion of the reservoir zone to a lower portion of the tubular conduits, and the separation means having a first outlet for the passage of weak liquor out of the minor portion toward the analyzer portion and a second outlet for the passage of refrigerant vapor out of the minor portion. It will be appreciated that, in operation, the major portion of the reservoir will comprise at least 50% of the reservoir and preferably above 90% of the reservoir and include solution at a temperature below the peak solution temperature. This solution will not be as depleted of refrigerant as desired for the weak liquor leaving the generator. The solution in the minor portion (less than 50% and preferably less than 10%) of the reservoir will be at or near the peak temperature and will have been sufficiently depleted of refrigerant during boiling in the vertical conduits to be conducted out of the generator as weak liquor. In many highly preferred forms, the second outlet opens from the minor portion into the major portion of the reservoir zone. The generator unit includes, in highly preferred forms, an analyzer portion with at least one coil connected at its lower end to the minor portion of the reservoir zone through the first outlet.

The separation means includes, in some preferred forms of the generator unit at least one flange extending from the housing, the flange and housing together defining therebetween a separation zone with an upper outlet for releasing refrigerant vapor into the reservoir zone and a lower opening for releasing weak liquor, and the generator further comprises a weak liquor outlet conduit connecting the lower outlet with the analyzer portion of the generator unit. Most preferably, the separation zone includes a weak liquor reservoir zone adjacent to the lower outlet, being the lowest portion of the separation zone. The weak liquor zone would then preferably communicate with each of the tubular conduits at a point intermediate the lower opening and opening of each tubular conduit (as, for example, at numeral 50 in FIG. 3).

In preferred forms of the method of the present invention, the temperature of the fluid in the vertical conduit is higher adjacent the upper outlet than adjacent the lower inlet. It will be appreciated that, because of the higher velocity adjacent the upper inlet, the temperature differential for incipient boiling will be less adjacent the upper outlet. Some preferred absorbent pairs are those described in U.S. Pat. No. 4,005,584 wherein the refrigerant is a fluorocarbon and the absorbent is furan derivative.

Preferred refrigerants are the fluorocarbon refrigerants (with their ASHRAE designations): dichloromonofluoroethane (R 21), monochlorodifluoromethane (R 22), trifluoromethane (R 23), monochloromonofluoromethane (R 31), dichlorotrifluoroethane (R 123), monochlorotrifluoroethane (R 133), monochlorotetrafluoroethane (R 124) and mixtures thereof. In the above designations, any isomer or mixture of isomers of the ethane derivatives may be used as, for example, $CH_2ClCF_3$ (R 133a) and $CHClFCHF_2$ (R 133).

Preferred furan-derivatives are the methyl, ethyl, propyl and butyl ethers of tetrahydrofurfuryl alcohol and mixtures thereof. Any isomer such as the n-butyl, i-butyl or t-butyl ethers, or mixtures, may be used. With such absorption pairs, the fluid temperature in the vertical conduit should not generally exceed about 400° F. and may be as low as about 150° F. Preferably, the rich liquor (absorbent pair) further comprises an organic phosphite stabilizer, as described in copending, commonly assigned application Ser. No. 760,489, filed Jan. 19, 1977 of M. B. Berenbaum et al. Such stabilized compositions are most suited to exposure to peak temperature up to 350° F. and above. With the minimum residence time at peak temperature provided by the present invention, such stabilized absorption pairs should have a useful life of many years under operating conditions.

In some preferred forms of the method, the separated refrigerant is passed through a reservoir of rich liquor upstream from the lower inlet of the vertical conduit; for example, note the refrigerant bubbles emerging from aperture 44a in FIG. 2. This reservoir of fluid (numeral 17 in the FIGS.) has a relatively high refrigerant concentration and is at a relatively low temperature, and thus, can cool the refrigerant bubbles and extract evaporated absorbent therefrom. Since the entire reservoir 17 is upstream from the vertical tubular conduits, such extracted absorbent will recirculate back through the boiler. In preferred forms, such as the embodiment shown in FIGS. 2 and 3, the refrigerant vapor (from the lower vertical passages) is passed through a convoluted path with condensing surfaces (e.g. numeral 51 in FIGS. 2) for removing evaporated absorbent from the refrigerant vapor.

In some preferred forms of the method, the weak liquor is driven out of the generator enclosure (as through the coil 19) by the pressure of refrigerant vapor.

In many highly preferred forms of the method, a solution high in refrigerant content is drawn into the lower inlet, refrigerant bubbles and a solution intermediate in refrigerant content are released from an intermediate outlet of the vertical tubular conduit, a solution intermediate in refrigerant content is drawn into an intermediate inlet of the vertical conduit; and refrigerant bubbles and a solution low in refrigerant content are released from the upper outlet. In many such more preferred forms, a portion of the solution low in refrigerant content is drawn back into the vertical conduit adjacent the intermediate inlet (as through aperture 50 in FIGS. 2 and 3). Also in many preferred forms, the solution weak in refrigerant content is separated from refrigerant vapor in the fluid coming out the upper outlet and conducted to a weak liquor reservoir wherefrom at least a portion of the solution low in refrigerant vapor is conducted away from the vicinity of the vertical conduits.

DESCRIPTION OF THE PREFERRED EMBODIMENTS

A generator unit 10 for an absorption refrigeration or heat pump system is shown in FIG. 1. The generator unit is generally cylindrical in shape, with an upper cylindrical wall 10a enclosing the top (heat exchanger or rectifier portion 23) of the generator 10 and the middle (analyzer portion) of the generator 10, with the separation between the top and middle portion being the distributor or spreader (distributor pan 22). The analyzer section is filled with weak liquor coils 19. Extending downwardly from the upper cylindrical wall 10a is lower cylindrical wall 10b (sometimes referred to herein as the "boiler wall" or "boiler side wall"), which is somewhat thicker than the upper cylindrical wall 10a. The generator 10 is closed at the bottom by a cup-shaped bottom wall 10c joined to the base of the boiler wall 10b. A pool of solution 17 having an upper surface 17a will, in operation, fill the central or reservoir zone of the boiler portion.

A plurality of fins 40 extend outwardly from the boiler wall 10b along a major portion of its height. A ring-shaped gas or oil burner 42 is disposed below the bottom wall 10c; and a insulation housing 41 is disposed around the boiler wall 10b, bottom wall 10c and burner 42 shaped to direct flames and hot exhaust gases from the burner 42 between the insulation housing 41 and boiler wall 10b and in good heat exchange relation with the fins 40. The burner 42, insulation housing 41 and fins 40 together form means to transfer heat into the boiler wall 10b.

The general operation of the generator 10 involves rich liquor (an absorbent solution high in refrigerant vapor) falling from the upper section of the generator 10 and being distributed by the distributor pan 22 over the coils 19 where it is preheated. Heat is in general transferred from combustion gases of the burner 42 through the fins 40 into the solution in pool 17 so as to boil same and generate refrigerant vapor which passes upwardly through the analyzer and rectifier portion and out the generator 10 (to a condenser). Solution from pool 17 (called "rich liquor") which is thus depleted of refrigerant (then called "weak liquor") is forced (by connections discussed below) through analyzer coils 19 and eventually out the generator 10 (to an absorber where it reabsorbs refrigerant and returns to the generator as "rich liquor").

In this application, the term "rich liquor" is used for the richest liquid in the boiler portion. Thus, referring to FIG. 3A, liquid having at least 29% R21 is considered "rich." It should be appreciated, however, that by use of an analyzer portion, the liquid entering the generator (as at distributor 22) will be even richer, as for example 40% R21. Of course, as discussed in copending application Ser. No. 786,773, the exact percentages will vary with design, operating conditions and absorption pairs.

Referring now to FIGS. 2 and 3, the detail of the boiler portion of the generator may be seen. The boiler wall 10b is formed by extrusion, drilling or other mechanical techniques with a series of vertical tubular conduits or "pump tubes" 43 extending the height of the lower generator wall 10b. An intermediate wall section 10d joins the upper generator wall 10a to the lower generator wall 10b and will be considered herein a part of the "boiler wall" 10b. An inner skirt or flange or jacket 44 is located radially inward from the boiler wall 10b, enclosing with the boiler wall 10b a minor portion 17b of the reservoir zone (also referred to herein as the "separation zone") normally filled by solution pool 17. A weak liquor coil 19 extends downwardly from the analyzer section (above surface 17a) of the generator and is connected at its inlet 19a to the minor portion 17b of the reservoir zone. A series of baffles 51 extend inwardly from the jacket 44 in alternating arrangement, with the coil 19 curving upward between the baffles 51. The baffles 51 and other structures in and around the solution pool 17 may be arranged in various configurations to control the concentration of refrigerant at various points in pool 17 (and particularly to prevent excessively low refrigerant content at inlet 45).

Each pump tube 43 has its lower inlet 45 formed in the lower ledge 46a of the boiler wall 10b, which lower ledge extends inwardly from the junction of the boiler wall 10b and bottom wall 10c. It will be appreciated that the zone within the "cup" of bottom wall 10c is the lowest portion of the reservoir zone occupied by solution pool 17, which lowest portion is beneath the lower inlet 45. A lower side aperture 47 extends inwardly from the pump tube 43 and communicates with the reservoir pool 17. The lower side aperture 47 is located a short distance above the lower inlet 45 and a separator flange 48 blocks the pump tube 43 at the top of the aperture 47, dividing the pump tube into an upper portion 43a and a lower portion 43b. The flange 48 extends inwardly beyond an inner surface of the boiler wall 10b. A small middle side aperture 49, above the separator flange 48, connects the lower end of the upper portion 43b of the pump tube 43 with the reservoir pool 17. If desired, the lower side aperture 47 and middle side aperture may be formed as a single hole in the boiler wall 10b which is divided by insertion of the separator flange 48 into two apertures. Above the middle aperture 49, the lowest end of the jacket 44 flares out to join the inside of the boiler wall 10b such that the major portion of the pump tube portion 43a is adjacent the minor portion 17b of the reservoir zone rather than being adjacent the major portion thereof which is occupied by reservoir pool 17.

An upper side aperture 50 connects the lower end of minor reservoir portion 17b with the pump tube portion 17a. The top of the pump tube forms, in the upper ledge 46b of wall portion 10b, an upper outlet 52 partially enclosed by a directing flange 52a which directs fluid passing upward through outlet 52 inwardly and downwardly into the minor reservoir portion 17b.

The jacket 44 has a refrigerant outlet aperture 44a connecting the minor reservoir portion 17b with the reservoir pool 17. The aperture 44b is at a sufficient height to be above the direct deflection path of fluid from directing flange 52a and also to open to an upper portion of the reservoir pool 17. The inlet 19a of the weak liquor coil 19 communicates through an aperture in the jacket 44 with the minor reservoir portion 17b. As depicted in FIG. 3, the inlet 19a is above the upper side aperture 50.

Figure 5:
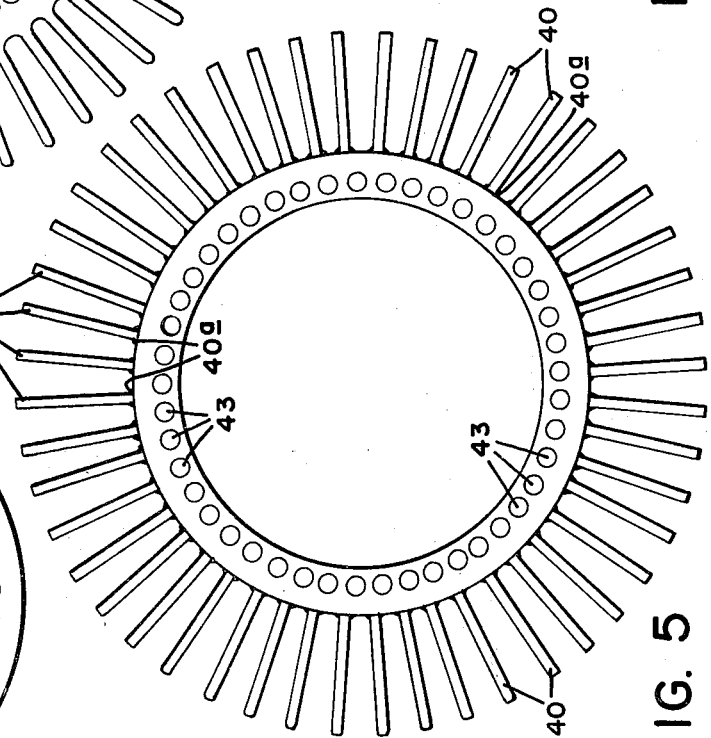
FIG. 5 is a top plan view taken along line 5—5 in FIG. 2.
Figure 4:
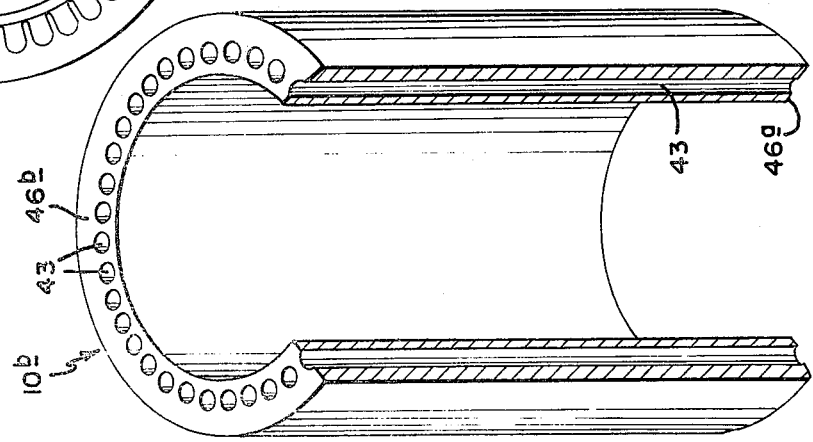
FIG. 4 is a perspective view, cut away, of the boiler wall component of the generator unit of FIG. 1.

Referring to FIGS. 4 and 5, the pump tubes 43 are circumferentially spaced within the boiler wall 10b. The fins 40 extend radially outwardly from the boiler portion 10b. The fins are joined by a heat sensitive solder 40a to the outside of the boiler wall 10b. As shown best in FIGS. 1 and 2, the fins correspond generally in overall vertical extend to the pump tubes 43 with an upper portion 40b extending even further outwardly than the main portion of the fin 40. The upper fin portion 40b may correspond generally in vertical extent with the upper pump tube portion 43a.

In the generator 10 as illustrated and described, the fin portions 40b extend further toward the insulation housing 41 than the lower portion of the fins 40 (see FIGS. 1 and 2). The purpose of this further extension is to increase the heat transfer through fin portions 40b so that the heat transfer in tube portion 43a may equal or, preferably, exceed the heat transfer in tube portion 43b. The same effect may be achieved by twisting the upper fin portions 40b once formed so that flue gases from burner 42 are slowed down and made turbulent adjacent fin portions 40b.

Operation of the First Embodiment

In the operation of the generator 10, a solution high in refrigerant content collects in the reservoir pool 17 after passing through and being preheated in the upper and middle portions of the generator 10. As this solution is drawn downwardly, its temperature increases because of heat transferred indirectly from the fins 49. Since it is preheated, this solution will be sufficiently hot and sufficiently rich in refrigerant to begin forming bubbles of refrigerant vapor. Some of these bubbles travel upwardly through the reservoir pool 17 and are either reabsorbed or reach the surface 17a. Those bubbles that form beneath the lower ledge 46a travel for the most part into the lower inlets 45 and upwardly through the lower pump tube portion 43b. Since the solution in tube portion 43b is relatively rich in refrigerant content, it will boil to form increasing amounts of refrigerant vapor by the heating action transferred inwardly from the fins 40. As vapor forms, the vertical velocity of fluid propelled by vapor lift action in portion 43b will increase drawing more fluid in through the lower inlet 45. The increased velocity also lowers the t required for boiling (as discussed in the Background Section). For R21-ETFE, the $\Delta t$ in the lower pump tube portion 43b will be no more than 60° F.–70° F. such that, for example, the relatively rich solution can boil at up to about 250° F. without the solution contacting wall surfaces hotter than 320° F. The fluid exiting through lower side aperture 47 will include refrigerant bubbles (as shown in FIG. 2) which rise in the reservoir pool. Although some of these bubbles may be reabsorbed, most will reach the surface 17a as described below.

With the refrigerant bubbles escaping upward, the refrigerant content in the reservoir pool 17 adjacent the flange 48 will be lower than at the top of the pool. It will be appreciated that, by extending inwardly a distance beyond lower side aperture 47, the flange 48 prevents refrigerant bubbles from being drawn through the middle side aperture 49. The solution that is drawn through the middle side aperture 49 into the upper pump tube section 43a is somewhat lower in refrigerant content than the solution drawn into the lower inlet 45. The heating action of the fins 40 through the boiler wall 10b causes bubbles to form in the upper pump tube section 43a, which bubbles rise and propel (by vapor lift action) the fluid in portion 43a toward the upper outlet 52. As the fluid rises, more heat is transferred from the fins 40, more boiling occurs and more refrigerant vapor is generated, further increasing the velocity. Adjacent the top outlet 52, the fluid is moving sufficiently fast for the $\Delta t$ not to exceed about 10°–20° F. This is most important because the liquid at this point will be leanest in refrigerant content and thus have the highest boiling point. The extremely low $\Delta t$ at the upper end of upper pump tube portion 43a permits the liquid to boil at about 280° F. (in this example) without exposure to wall temperature above about 300° F. or to boil at about 350° F. without exposure to wall temperatures above about 370° F. Additionally, since the volume of and residence time in the upper portion of the upper pump tube portion 43a and portion 17b is extremely short, the exposure of solution to this hottest temperature is reasonably short.

Upon exiting the pump tube 43 through upper outlet 52, the fluid is directed inwardly and downwardly by the directing flange 52a such that the liquid (depleted of refrigerant) will collect in the lower portion of the minor reservoir zone 17b (this lower portion is sometimes referred to herein as the "weak liquor reservoir"). Refrigerant vapor will rise to the top of the minor reservoir zone 17b and exit through refrigerant bubble outlet 44a into the major reservoir zone. As depicted in FIG. 2, this outlet 44a is slightly below the liquid surface 17a such that these bubbles pass through a small portion of the pool 17. This provides a degree of rectification (condensing absorbent vapor from the bubbles) and causes the solution in the reservoir pool 17 to be heated and weakened. The bubbles from the lowest portion of the pool 17 adjacent the bottom plate 10c and from the lower side apertures 47 also tend to draw refrigerant from the pool, lowering its refrigerant concentration still further. The action of the bubbles from apertures 47 and the lower end of reservoir pool 17 are enhanced (in this embodiment) by the circuitous path traveled by these bubbles around baffles 51. The more this technique of rectification is used, the higher the temperature near inlet 45 can become. If desirable to limit the temperature near inlet 45, the passage of bubbles through the pool 17 may be reduced by placing outlet 44a above the liquid surface or by other structural changes.

The liquid in the lower portion of the minor reservoir zone 17b will be very lean in refrigerant content and, corresponding, very hot. A portion of it may be recirculated into upper pump tube portion 43a. The purpose is to provide, by recirculation, high liquid and vapor flow rates through the tubes 43a, in excess of the liquid flow through aperture 49 and out through apertures 44a and 19a. The preferred path of travel through the coils 19 and the preferred arrangement of the coils 19 are discussed in my commonly assigned, copending application Ser. No. 796,631, filed May 12, 1977. It will suffice for present purposes to say that heat is extracted from the weak liquor in coils 19 to preheat rich liquor in the analyzer portion; and, in the rectifier or heat exchanger (upper) portion 23 of the generator unit 10, further heat is extracted from the weak liquor. It should be appreciated that the refrigerant concentration of the weak liquor is low (as is desirable for maximum efficiency and minimum fluid flow between the generator and absorber units) throughout its travel beyond inlet 19a because of the high temperature attainable in pump tube portion 43a (without wall temperature so high as to cause unacceptable decomposition or corrosion rates).

Referring to FIGS. 3 and 4, it will be appreciated that the pump tubes 43 are circumferentially spaced within the boiler wall 10b. Elements such as side apertures 47, 49 and 50 and separating flange 48 may also be circumferentially spaced to coincide with the pump tubes. However, these elements may conveniently extend circumferentially between several pump tubes as by making several apertures 47, 49 and 50 a single slot around 360° of arc along the inner surface of the boiler wall 10b and communicating with all pump tubes. The flange 48 would then be a curved element fitting within the slot and splitting each communicating pump tube into an upper portion 43a and a lower portion 43b.

The minor reservoir 17b is preferably a common (annular) reservoir for all pump tubes. The inlet 19a may be for a single tube or a plurality of tubes whose inlets are (in some forms equally) spaced around a circle. Multiple inlets may be used to simplify communication with a like number of analyzer coils (as described more fully in my application Ser. No. 796,631, filed May 12, 1977) with circumferential spacing of inlets designed to produce a controlled ratio of fluid flow into each analyzer coil. These flows may be equal because inlets 19a are equally sized and spaced or made larger for some analyzer coils (if for example the ones with larger heat exchange surface). However apertures 49 are generally sized so that by providing an equal restriction into each tube the flow rate into each tube is equalized.

It is within the scope of the present invention to eliminate apertures 47 and 49 and dividing flange 48 so as to form a plurality of single, long pump tubes 43 extending the entire height of the boiler wall 10b. The vapor lift action within such a tube would produce greater velocities at the top than at the bottom but, by careful location of apertures 50, similar control of wall temperatures could be achieved. It is easier, however, allowing for greater tolerance, to achieve the wall temperature control by dividing each pump tube into sections 43a and 43b. It is thus preferred for R21-EFTE that a substantial portion of the refrigerant content be boiled off in the lower pump tube portion 43b (at a relatively high refrigerant content and thus a low boiling temperature), wherein somewhat larger Δt's are not objectionable, before drawing the liquid into the upper pump tube portion 43a (wherein the hottest boiling temperatures are achieved and) wherein small Δt's are critical.

The use of temperature-sensitive solder or brazing alloy 40a provides a safety feature insofar as the solder will melt should temperatures exceed a predetermined level at the junction of the fins 40 and boiler wall 10b, which temperature corresponds to an acceptable level of overheating of the boiler wall 10b. The fins 40 are caused to drop off and heat transfer to be reduced only to prevent excessive overheating of wall 10b.

Other Embodiments

A modified boiler wall 110b and fin 140 structure is shown in FIG. 6, similar to the design of generator 10, but with the fins 140, boiler wall 110b and pump tubes 143 extruded simultaneously as an integral unit. This design takes advantage of the extrudability of the preferred aluminum and aluminum alloy materials. The various side apertures would then be formed in the boiler wall 110b, flanges similar to flanges 48, 44 and 52 would be attached and the boiler wall 110b would be joined to generator wall portions similar to elements 10d and 10a.

Figure 7:
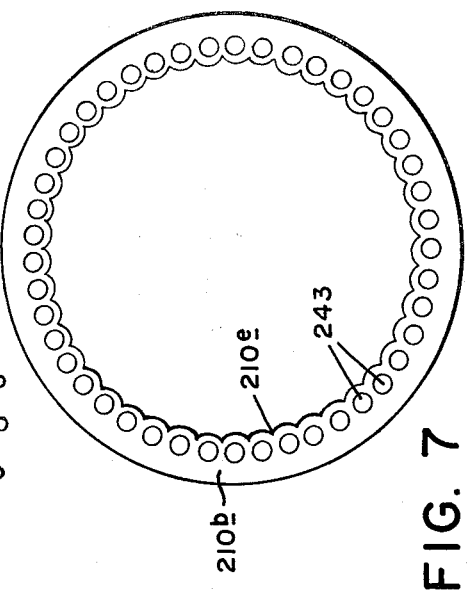
FIG. 7 is a view similar to FIG. 5 according to a third embodiment of the present invention.

The boiler wall 210b shown in FIG. 7 differs from the boiler wall 10b only in having a convoluted inner surface 210e being concentric in each arc portion with the adjacent pump tube 243 so as to conserve material and provide additional heat transfer surface inwardly as the surface 210e. This arrangement, formed preferably by extrusion, may also include integral fins as shown in FIG. 6.

Figure 8:
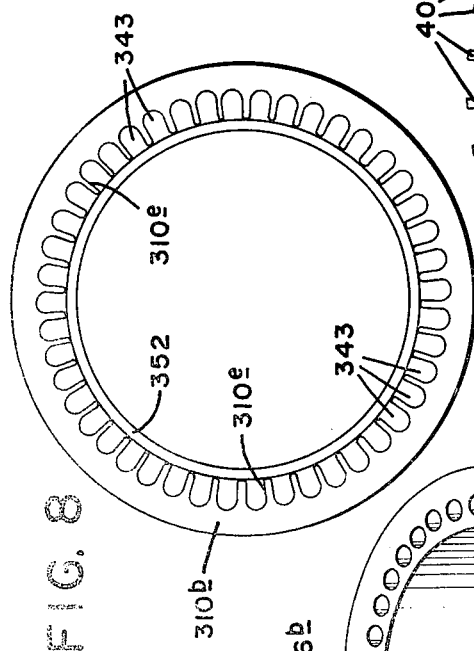
FIG. 8 is a view similar to FIG. 5 according to a fourth emobidment of the present invention.

The boiler wall 310b shown in FIG. 8 has generally D-shaped, vertically extending grooves 343 formed (as by extrusion) circumferentially spaced along its interior surface. An annular cylindrical jacket member 352 fits snuggly within the projections 310e left in the inner surface of wall 310b, between D-shaped grooves closing off each groove and thereby forming the pump-tubes along each groove 343. It will be appreciated that side apertures similar to elements 47, 49 and 50 in FIGS. 2 and 3 may conveniently be formed in the cylindrical jacket 352 before insertion, and flanges similar to elements 48 and 44 in FIGS. 2 and 3 may be unitary with or joined to the cylindrical jacket 352 before insertion. Boiler wall 310b may be formed with integral fins, as in FIG. 6.

Other additions, deletions and modifications in the above-described embodiments may be made without departing from the spirit and scope of the present invention as set forth in the claims that follow.

I claim:

1. A generator unit of an absorption heat pump system for separating rich liquor into refrigerant vapor and weak liquor, and including a boiler portion at the lower portion thereof and comprising:
   (a) an upstanding housing defining therewithin a central space with a reservoir zone in the lower portion thereof for storing the rich liquor solution and also defining a plurality of vertical tubular conduits around the reservoir zone, each tubular conduit having a lower opening communicating with the reservoir zone for drawing solution therefrom and an upper opening for releasing refrigerant vapor and weak liquor;
   (b) heat transfer means for collecting heat from an external source and transferring the heat into said tubular conduits; and
   (c) separation means communicating with the upper openings of said tubular conduits for separating refrigerant vapor from weak liquor.

2. The generator unit of claim 1 wherein the lower portion of said housing being the boiler housing is cylindrical and said plurality of tubular openings are formed in said boiler housing circumferentially spaced around said reservoir zone.

3. The generator unit of claim 2 wherein said boiler housing forms a lower ledge overlaying a lowest portion of the reservoir zone and said lower openings of said tubular conduits are formed in said lower ledge.

4. The generator unit of claim 2 wherein said housing is of aluminum, copper or their alloys and said tubular conduits are formed by extrusion.

5. The generator of claim 1 wherein said tubular conduits are drilled in said lower portion of said housing.

6. The generator unit of claim 1 wherein said heat transfer means include a plurality of fins projecting outwardly from said lower portion of said housing adjacent said tubular conduits.

7. The generator unit of claim 6 further comprising means joining said fins to said housing which means permit said fins to detach from said housing upon exceeding a predetermined temperature.

8. The generator unit of claim 6 wherein said fins are unitary with said lower portion of said housing.

9. The generator unit of claim 8 wherein said fins and lower portion of said housing are extruded as a unit with said tubular conduits formed in said lower portion by extrusion.

10. The generator unit of claim 6 wherein said fins extend vertically from a height adjacent said lower openings to a height adjacent said upper openings.

11. The generator unit of claim 1 wherein said lower portion of said housing also defines a plurality of lower apertures each opening a vertical tubular conduit to said reservoir zone at a height above said lower openings.

12. The generator unit of claim 11 wherein said housing defines an analyzer portion within said central space above said reservoir zone and said separation means separates said reservoir zone into a major portion which communicates with said lower openings and a minor portion adjacent the upper portion of said tubular conduits, said lower apertures connecting said major portion of said reservoir zone to a lower portion of said tubular conduits, and said separation means having a first outlet for the passage of weak liquor out of said minor portion toward the analyzer portion and a second outlet for the passage of refrigerant vapor out of said minor portion.

13. The generator unit of claim 12 wherein said second outlet opens from said minor portion into said major portion of said reservoir zone.

14. The generator unit of claim 12 wherein the analyzer portion of the generator unit includes a coil connected at its lower end to said minor portion of said reservoir zone through said first outlet.

15. The generator unit of claim 1 wherein said housing defines an analyzer portion within said central space above said reservoir zone and said separation means includes at least one flange extending from said housing, the flange and the housing together defining therebetween a separation zone with an upper outlet for releasing refrigerant vapor into said reservoir zone and a lower opening for releasing weak liquor, and said generator further comprises a weak liquor outlet conduit connecting said lower outlet with the analyzer portion of the generator unit.

16. The generator unit of claim 15 wherein each tubular conduit communicates with said reservoir zone through said lower inlet, through a lower side aperture above said lower inlet and through a middle side aperture above said lower side aperture and below said upper opening and wherein each said tube is blocked between said lower side aperture and said middle side aperture.

17. The generator of claim 15 wherein said separation zone includes a weak liquor reservoir zone adjacent to said lower outlet, being the lowest portion of said separation zone.

18. The generator unit of claim 17 wherein said weak liquor zone communicates with each of said tubular conduits at a point intermediate the lower opening and upper opening of each tubular conduit.

19. The generator unit of claim 18 wherein said housing is of aluminum, copper or their alloys and said tubular conduits are formed by extrusion.

20. The generator unit of claim 18 wherein said lower portion of said housing is cylindrical and said plurality of tubular openings are formed in said lower portion circumferentially spaced around said reservoir zone.

21. The generator unit of claim 18 wherein said housing forms a lower ledge overlaying a lowest portion of the reservoir zone and said lower openings of said tubular conduits are formed in said lower ledge.

22. A method of separating a rich liquor comprising a refrigerant and a higher-boiling absorbent into refrigerant vapor and a solution low in refrigerant content comprising the steps:
 (a) drawing the rich liquor into a lower inlet of a vertical tubular conduit at a temperature at which bubbles of refrigerant vapor are forming in the rich liquor,
 (b) heating the rich liquor in the conduit thereby increasing the formation of bubbles of refrigerant vapor,
 (c) driving the rich liquor upward in the vertical tubular conduit with increasing speed by the vapor lift action of refrigerant bubbles to an upper outlet of the vertical tubular conduit, and
 (d) separating the fluid coming out of the upper outlet of the vertical tubular conduit into refrigerant vapor and a solution low in refrigerant content.

23. The method of claim 22 wherein the temperature of the fluid in the vertical tubular conduit is higher adjacent the upper outlet than adjacent the lower inlet.

24. The method of claim 23 wherein the refrigerant is a fluorinated hydrocarbon selected from dichloromonofluoromethane, monochlorodifluoromethane, trifluoromethane, monochloromonofluoromethane, dichlorotrifluoroethane, monochlorotrifluoroethane, monochlorotetrafluoroethane and mixtures thereof and the absorbent is selected from methyl, ethyl, propyl and butyl ethers of tetrahydrofurfuryl alcohol and mixtures thereof.

25. The method of claim 24 wherein the temperature of the fluid in the vertical conduit does not exceed about 375° F. and is at least about 200° F.

26. The method of claim 25 wherein the fluid at the upper outlet of the vertical conduit is about 10° F. feet to about 60° F. hotter than the fluid at the lower inlet of the vertical conduit.

27. The method of claim 24 wherein the rich liquor further comprises an organic phosphite stabilizer.

28. The method of claim 22 further comprising passing the separated refrigerant through a reservoir of rich liquor upstream from the lower inlet of the vertical conduit.

29. The method of claim 28 wherein the refrigerant vapor is passed through a convoluted path with condensing surfaces for removing evaporated absorbent from the refrigerant vapor.

30. The method of claim 22 further comprising driving the weak liquor out of a generator enclosure by the pressure of the refrigerant vapor.

31. The method of claim 22 wherein solution high in refrigerant content is drawn into the lower inlet; refrigerant bubbles and a solution intermediate in refrigerant content are released from an intermediate outlet of the vertical tubular conduit; a solution intermediate in refrigerant content is drawn into an intermediate inlet of the vertical conduit; and refrigerant bubbles and a solution low in refrigerant content are released from the upper outlet.

32. The method of claim 31 wherein a portion of the solution low in refrigerant content is drawn back into the vertical tubular conduit adjacent the intermediate inlet.

33. The method of claim 31 wherein the solution weak in refrigerant content is separated from refrigerant vapor in the fluid coming out the upper outlet and conducted to a weak liquor reservoir wherefrom at least a portion of the solution low in refrigerant vapor is conducted away from the vicinity of the vertical conduits.

34. A method of separating a solution comprising a lower boiling component and a higher-boiling component into a vapor rich in lower boiling component and a solution weak in lower boiling component content comprising the steps:
 (a) drawing the solution into a lower inlet of a vertical tubular conduit at a temperature at which bubbles of lower boiling component are forming in the solution,
 (b) heating the solution in the conduit thereby increasing the formation of bubbles,
 (c) driving the solution upward in the vertical tubular conduit with increasing speed by the vapor lift action of bubbles to an upper outlet of the vertical tubular conduit, and
 (c) separating the fluid coming out of the upper outlet of the vertical tubular conduit into a vapor phase and a liquid phase.

35. The method of claim 34 wherein the solution is drawn into the lower inlet; bubbles and a liquid intermediate in lower boiling component content are released from an intermediate outlet of the vertical tubular conduit; liquid intermediate in lower boiling component content is drawn into an intermediate inlet of the vertical conduit and bubbles and a liquid weak in lower boiling component are released from the upper outlet.

36. An apparatus for separating a solution comprising two materials of different boiling points into a vapor rich in the lower boiling component and a liquid weak in the lower boiling component, and including a boiler portion at the lower portion thereof and comprising:
 (a) an upstanding housing defining therewithin a central space with a reservoir zone in the lower portion thereof for storing the solution and also defining a plurality of vertical tubular conduits around the reservoir zone, each tubular conduit having a lower opening communicating with the reservoir zone for drawing solution therefrom and an upper opening for releasing vapor and liquid;
 (b) heat transfer means for collecting heat from an external source and transferring the heat into said tubular conduits; and
 (c) separation means communicating with the upper openings of said tubular conduits for separating vapor from liquid.

* * * * *

UNITED STATES PATENT OFFICE
CERTIFICATE OF CORRECTION

Patent No. 4,127,993    Dated December 5, 1978

Inventor(s) Benjamin A. Phillips

It is certified that error appears in the above-identified patent and that said Letters Patent are hereby corrected as shown below:

Col. 14, line 58, "10° F. feet" should read --10°F--

Signed and Sealed this

Fifteenth Day of May 1979

[SEAL]

Attest:

RUTH C. MASON
Attesting Officer

DONALD W. BANNER
Commissioner of Patents and Trademarks